(12) United States Patent
Den Haak et al.

(10) Patent No.: US 10,767,703 B2
(45) Date of Patent: Sep. 8, 2020

(54) ROLLER WITH INTEGRATED LOAD DETECTION

(71) Applicant: Aktiebolaget SKF, Gothenburg (SE)

(72) Inventors: Nicolaas Simon Willem Den Haak, Zwijndrecht (NL); Gertjan van Amerongen, Scherpenzeel (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/211,845

(22) Filed: Dec. 6, 2018

(65) Prior Publication Data
US 2019/0203773 A1   Jul. 4, 2019

(30) Foreign Application Priority Data

Jan. 3, 2018  (DE) .......................... 10 2018 200 048

(51) Int. Cl.
*F16C 41/00*   (2006.01)
*F16C 33/34*   (2006.01)
(Continued)

(52) U.S. Cl.
CPC ............ *F16C 41/008* (2013.01); *B65G 43/02* (2013.01); *F16C 19/361* (2013.01); *F16C 33/34* (2013.01);
(Continued)

(58) Field of Classification Search
CPC ...... F16C 19/361; F16C 33/34; F16C 41/008; F16C 2233/00; G01B 7/14; G01B 7/24;
(Continued)

(56) References Cited

U.S. PATENT DOCUMENTS

| | | | | |
|---|---|---|---|---|
| 4,175,430 A | * | 11/1979 | Morrison | ................ F16C 19/30 |
| | | | | 73/862.541 |
| 6,535,135 B1 | * | 3/2003 | French | ..................... B61K 9/04 |
| | | | | 340/682 |

(Continued)

FOREIGN PATENT DOCUMENTS

| | | | | |
|---|---|---|---|---|
| WO | WO-2010069705 A1 | * | 6/2010 | ............. F16C 29/04 |
| WO | WO-2015032445 A1 | * | 3/2015 | ............ G01M 13/04 |

(Continued)

OTHER PUBLICATIONS

Hari Mohanachandran, Contactless Load Sensor, Oct. 31, 2016, 33 pg.

*Primary Examiner* — Marcus Charles
(74) *Attorney, Agent, or Firm* — Garcia-Zamor Intellectual Property Law; Ruy Garcia-Zamor; Bryan Peckjian

(57) ABSTRACT

A sensorized roller of a bearing, the sensorized roller having a sensor module located within an axially extending hollow cylindrical bore. The sensor module is equipped with one or more deformation sensors for detecting deformation of the roller bore due to a radial load acting on the roller. The sensor module comprises a rigid housing that is shaped to fit inside the roller bore and is mounted to the roller bore with a small radial clearance between an outer cylindrical surface of the housing an inner cylindrical surface of the bore. Each of the one or more deformation sensors is formed by a proximity sensor that is accommodated at the outer cylindrical surface of the housing. A sensing element of the proximity sensor faces the inner cylindrical surface of the roller bore and measures a radial gap therebetween; the radial gap being indicative of bore deformation.

13 Claims, 3 Drawing Sheets

(51) Int. Cl.
*G01B 7/14* (2006.01)
*B65G 43/00* (2006.01)
*G01B 7/24* (2006.01)
*F16C 19/16* (2006.01)
*F16C 19/36* (2006.01)
*G01L 5/00* (2006.01)
*B65G 43/02* (2006.01)
*G01G 23/00* (2006.01)

(52) U.S. Cl.
CPC .............. *G01B 7/14* (2013.01); *G01B 7/24* (2013.01); *G01L 5/0009* (2013.01); *F16C 2233/00* (2013.01); *G01G 23/005* (2013.01)

(58) Field of Classification Search
CPC ......... G01P 3/42; G01L 5/0009; B65G 43/00; B65G 43/39; G01G 23/005
USPC ............... 384/446, 448, 479, 489, 537, 543; 340/621, 682; 73/862.392, 862.626, 73/862.451
See application file for complete search history.

(56) References Cited

U.S. PATENT DOCUMENTS

| | | | |
|---|---|---|---|
| 8,961,021 B2* | 2/2015 | Stubenrauch | F16C 41/008 |
| | | | 384/448 |
| 9,127,649 B2 | 9/2015 | Matsuda | |
| 9,352,911 B2* | 5/2016 | Hearn | G01G 11/003 |
| 2011/0182536 A1* | 7/2011 | Matsuda | F16C 19/522 |
| | | | 384/448 |
| 2012/0020603 A1 | 1/2012 | Stubenrauch et al. | |
| 2014/0157880 A1 | 6/2014 | Matsuda | |
| 2017/0315013 A1* | 11/2017 | Takemoto | G01L 23/10 |
| 2018/0003227 A1 | 1/2018 | Gerrit-Jan et al. | |

FOREIGN PATENT DOCUMENTS

| | | | | |
|---|---|---|---|---|
| WO | WO-2015032449 A1 * | 3/2015 | | F16C 41/004 |
| WO | 2016016054 A1 | 2/2016 | | |
| WO | WO-2018141009 A1 * | 8/2018 | | B65G 39/09 |

* cited by examiner

ROLLER WITH INTEGRATED LOAD DETECTION

CROSS-REFERENCE OF RELATED APPLICATIONS

This application claims priority to German patent application no. 102018200048.4 filed on Jan. 3, 2018, the contents of which are fully incorporated herein by reference.

TECHNICAL FIELD OF THE PRESENT INVENTION

The present invention relates to the field of load detection in roller bearings and is more particularly directed to a bearing roller with a hollow bore in which one or more sensors are arranged for detecting deformation of the roller bore due to radial load acting the bearing.

BACKGROUND OF THE PRESENT INVENTION

An example of a bearing roller of this kind is known from WO 2016/016054. A device for detecting a radial load acting on the roller is disclosed. The device comprises a load cell that spans the roller bore diameter and is in fixed contact with diametrically opposite portions of the bore surface. When the roller is radially loaded, the circular cross section of the hollow bore is deformed to an elliptical shape. Under load, the load plane remains the same, but the contact locations of the load cell rotate within this plane during rotation of the roller. As a result, the contact locations not only experience radial displacement relative to each other, but also a transverse displacement. This effect is sometimes referred to as a chewing effect. The load cell comprises a bending beam and a hinge arrangement and is designed such that the contact locations move with the bore surfaces, via elastic deformation of the load cell, to take up the motion associated with the chewing effect.

A further example of a sensorized bearing roller is disclosed in U.S. Pat. No. 9,127,649. The roller is equipped with a sensor that detects a physical state of the bearing roller, which sensor is attached to an inner surface of the roller bore, which defines a cavity. A signal from the sensor is received by a processing portion, which processes and transmits the detection signal to a receiver outside of the bearing. The processing portion is provided on a substrate accommodated within the bore cavity, whereby a substrate retaining material is interposed between the sensor and the substrate. The retaining material may be an elastomeric material that is poured into the bore cavity in liquid state and then cured. Due to the above-mentioned chewing motion inside the roller bore, there is a risk that the elastomer material will become detached from the inner surface of the bore and that this will cause strain on, if not rupture of, the electrical connections between the sensor element and processing electronics.

There is still room for improvement.

BRIEF SUMMARY OF THE PRESENT INVENTION

The present invention defines a roller of a roller bearing, the roller having a hollow cylindrical bore extending in an axial direction of the roller whereby a sensor module comprising one or more sensors for detecting deformation of the roller bore due to a radial load acting on the roller is arranged within the roller bore. The sensor module comprises a rigid housing that is shaped to fit inside the roller bore and is mounted thereto with a small radial clearance between an outer cylindrical surface of the housing an inner cylindrical surface of the roller bore. According to the invention, at least one proximity sensor is accommodated at the outer cylindrical surface of the housing such that a sensing element of the proximity sensor faces the inner cylindrical surface of the roller bore and measures a radial gap therebetween.

The housing supports the at least one proximity sensor within the roller bore, thereby enabling direct and contact-free measurement of bore deformation under radial loading, which produces changes in the radial gap between the inner bore surface and the sensing element of the at least one proximity sensor. Suitably, the housing is radially located within the bore by means of first and second resilient elements arranged in the annular gap between the roller bore and the housing outer surface. The resilient elements take up radial deformations of the bore and prevent contact between the bore surface and the housing outer surface. As a result, the sensor module as a whole is insensitive to the chewing motion experienced by conventional sensor configurations which are in contact with or attached to the roller bore.

In an embodiment, the sensor module comprises one pair of proximity sensors arranged diametrically opposite from each other around a center axis of the sensor module. When the center axis of the sensor module is fully aligned with a center axis of the roller bore, a measured change in the radial gap between a proximity sensor and the inner cylindrical surface of the roller bore corresponds to a change in the bore radius (or bore diameter) at that location. A single proximity sensor is then sufficient. In practice, there may well be a slight radial offset between the bore axis and sensor module axis. The measurement from a single proximity sensor will contain this offset. In the case of two diametrically opposite sensors, one sensor will measure a positive offset and the other sensor will measure a negative offset, thereby enabling the offset to be cancelled out. In effect, the sensor pair measures changes in the diameter of the roller bore when the bore deforms under radial loading. Under dynamic load conditions, where the sensor module rotates together with the roller about the roller axis, maximum and minimum peaks in the sensor signals are detected, due to the generally elliptical deformation shape which the roller bore adopts under radial loading. Suitably, the differential measurement of the maximum peaks and minimum peaks from the two sensor signals are used to calculate the load acting on the roller.

In a further embodiment, the sensor module comprises two or more pairs of diametrically opposite proximity sensors, whereby the sensor pairs are axially spaced with respect to each other. This enables a measurement of the distribution of the radial load acting on the roller during bearing operation. If the radial load measured at an axially outer side of the roller is higher than the radial load measured in an axially central area, this can be indicative of misalignment or excessive thermal expansion that can adversely affect bearing life.

The proximity sensor used in each sensor pair may be a capacitive sensor, an inductive sensor or an optical sensor such as a Fabry-Perot fiber sensor. The roller operates in an environment where lubricant is present. The accuracy of measurement of a capacitive sensor or an optical sensor could be compromised if e.g. grease were to become interposed between the bore surface and the sensing element. Thus, in an advantageous embodiment, the housing of the sensor module is mounted to the roller bore at first and second axial ends of the housing by a sealing element that encloses the annular gap between the housing outer surface and the roller bore. The sealing elements exclude the ingress of lubricant and other contamination, to protect accurate functioning of the proximity sensors.

In applications where the ingress of lubricant or other contaminants might nevertheless occur, the use of an inductive sensor is preferred, as such sensors are less sensitive to the presence of e.g. grease between the sensing element and the roller bore surface. In a preferred embodiment, the proximity sensor comprises an induction coil, suitably a circular induction coil that is mounted to the housing so as to face the roller bore. The housing may for example comprise a seat machined into its outer surface in which the circular coil is accommodated. Suitably, the seat also has an aperture to enable the coil to be connected to e.g. a microcontroller or inductance digital converter (IDC) accommodated within the housing on a PCB. Alternatively, the coil may form part of a PCB-mounted induction sensor that is arranged at the outer surface of the housing.

Suitably, the sensor module further comprises electronics for processing the signal from each proximity sensor and wirelessly transmitting the processed result to an external receiver. The electronics may comprise a processor and an antenna, which are also located within the housing on a PCB, so as to be protected from grease and other contaminants. An energy source such as a battery or power harvesting means is also located within the housing. The sensor module is thus a self-contained unit which can be easily mounted within the hollow bore of a roller.

The invention will now be described in further detail with reference to the accompanying drawings.

DETAILED DESCRIPTION OF THE PRESENT INVENTION

Figure 1:
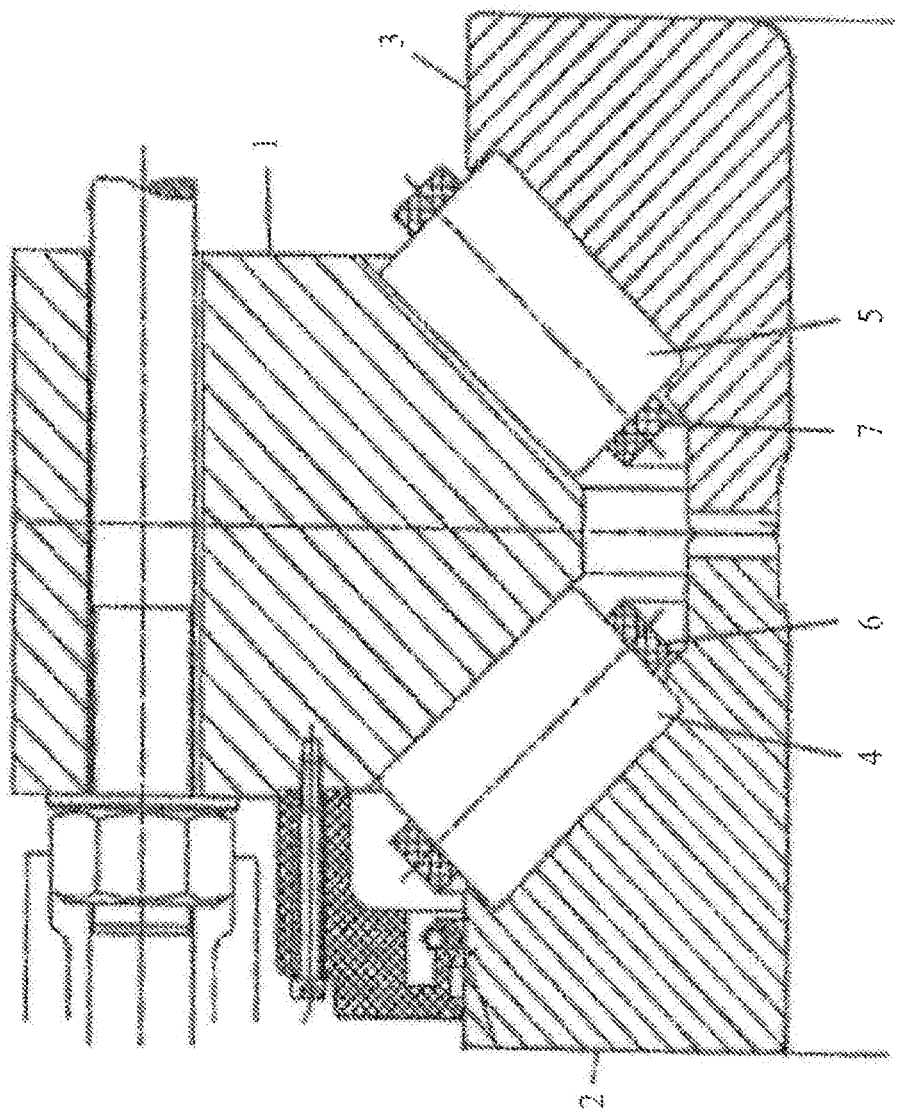
FIG. 1 presents a part cross-sectional view of a roller bearing that may be equipped with a roller, in accordance with the invention.

An example of a bearing that is suitable for supporting the main shaft of a wind turbine is shown in FIG. 1. The bearing must withstand high axial loads as well as radial loads and is executed as a double-row tapered roller bearing. The bearing comprises an outer ring 1 provided with conically shaped first and second outer raceways for a first set 4 and a second set 5 of tapered rollers. The bearing further comprises first and second inner rings 2, 3 which are respectively provided with conically shaped first and second inner raceways for the first and second roller sets 4, 5. In addition, a first cage 6 and a second cage 7 are provided for retaining the rollers of the first and second roller sets respectively. Typically, the cages are formed from segments that abut each other in circumferential direction.

To provide the necessary stiffness and ensure a long service life, the bearing is preloaded. The axial position of the inner rings 2, 3 relative to the outer ring 1 is set such that the first and second roller sets 4, 5 have a negative internal clearance. The first and second inner rings are then bolted together or otherwise axially clamped to maintain the preload over the lifetime of the bearing. In practice, however, preload gradually decreases over time. If preload is lost and the radial load on a roller becomes zero, it will be able to move towards a small-diameter side of the radial gap between the inner and outer raceways, possibly leading to an excessive load that will reduce the service life of the bearing. Since a main shaft bearing is a critical and expensive component of a wind turbine, it is important to detect if the bearing loses preload. It is also beneficial to be able to measure the radial load acting on the bearing and to characterize the angular extent of the bearing's loaded zone. One way of doing this is to measure the radial load acting on an individual roller. In the depicted bearing, at least one of the solid tapered rollers in either of the first and second roller sets 4, 5 is replaced with a sensorized roller.

Figure 2A:
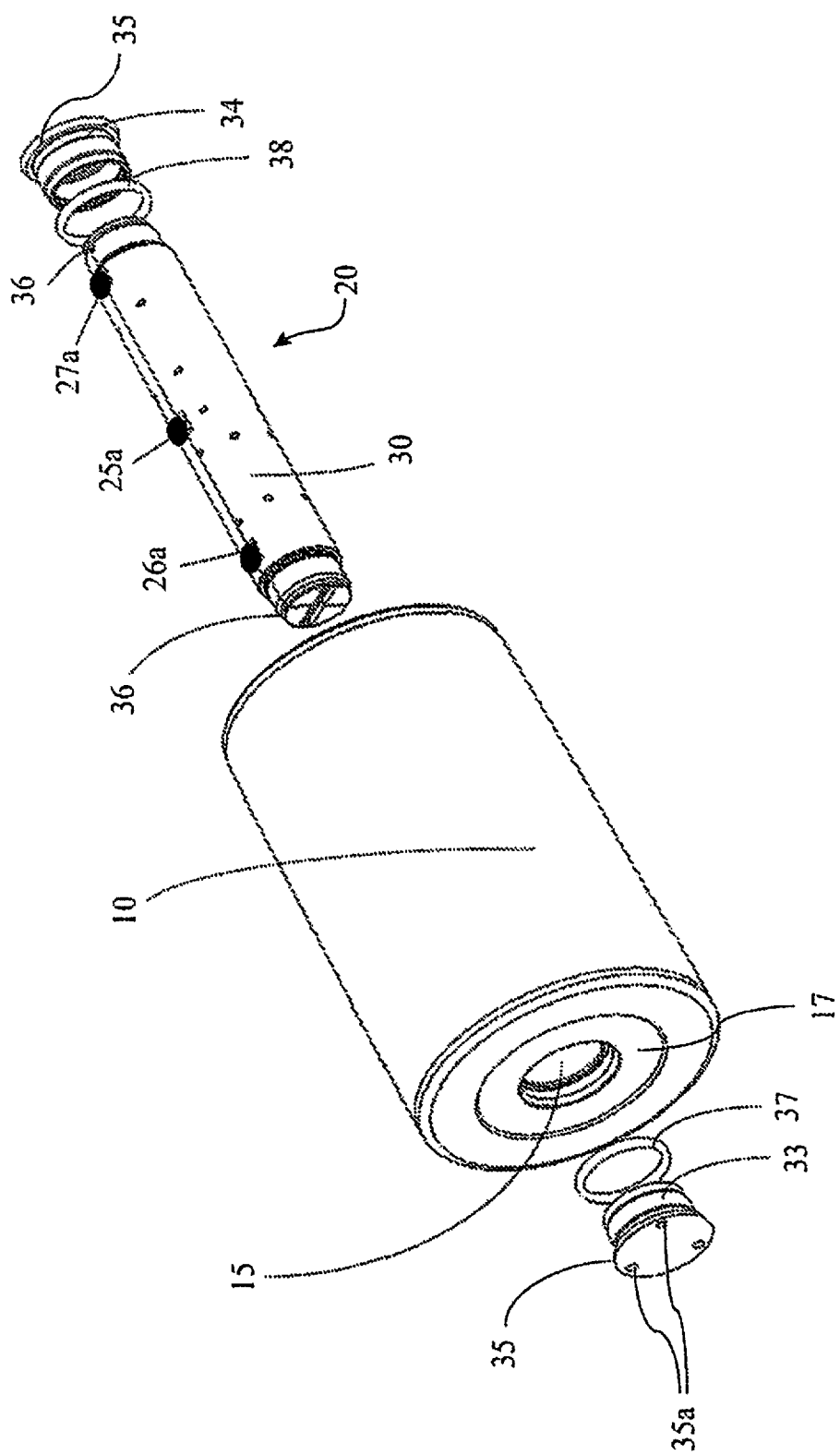
FIG. 2A presents a perspective view of a roller with a holler bore and an example of a sensor module according to the invention, prior to insertion within the roller bore.
Figure 2B:
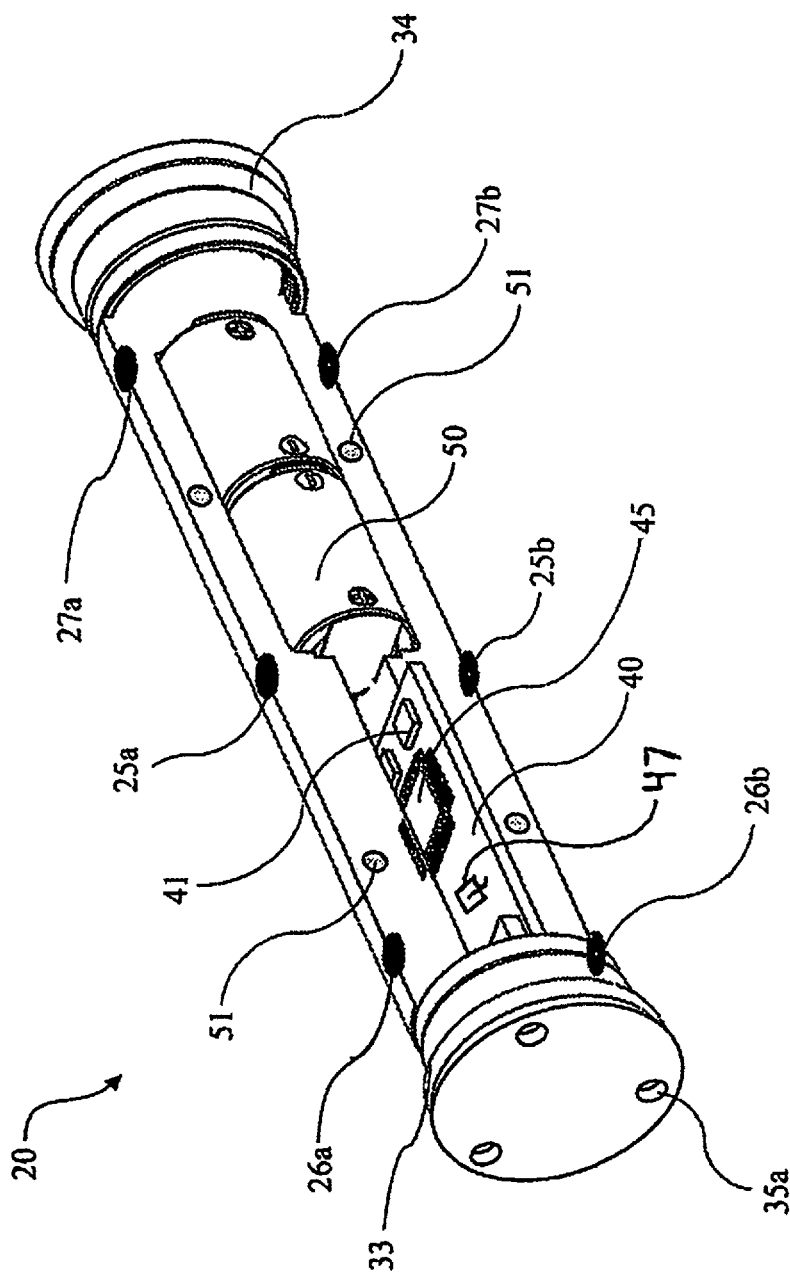
FIG. 2B presents a perspective view of the sensor module from FIG. 2A, with sections of a housing of the sensor module removed to reveal the underlying components.

The sensorized roller has a hollow cylindrical bore into which a sensor module is inserted. FIG. 2A shows a perspective view of an example of such a roller 10, prior to insertion of the sensor module 20 within the roller bore 15. A perspective view of the sensor module is shown in FIG. 2B, whereby some sections have been removed to reveal the underlying components.

The sensor module 20 comprises a housing 30 made of a rigid material that is shaped to fit within the roller bore with a small radial clearance. The bore 15 is cylindrical in shape and extends through the full axial length of the roller. The housing has a main cylindrical body which has a smaller diameter than the bore diameter and is dimensioned to be contained within the dimensions of the roller. The sensor module 20 is located in radial direction relative to the cylindrical bore 15 by first and second resilient sealing elements 37, 38, which are arranged between a radially inner surface of the bore and a radially outer surface of the housing 30. O-rings are used in the depicted example. The housing is axially located within the roller bore 15 by first and second end caps 33, 34 which have a main cylindrical part that fits over the main cylindrical body of the housing 30 at either axial end. Each end cap also has a flange part 35 with a larger diameter than the main cylindrical part which, after assembly, bears against a recessed area 17 that is machined into each axial end face of the roller 10. The housing 30 of the sensor module is thus accurately positioned with respected to the roller bore 15. The depth of the recessed area 17 is at least equal to the thickness of the flange part 35, such that there is no protrusion of the sensor module housing outside of the roller.

When a radial load acts on the roller 10, the circular cross-section of the roller bore 15 deforms to an elliptical shape, resulting in a change of bore diameter. To measure this change at a central axial location, the sensor module is equipped with a first pair of proximity sensors 25a, 25b accommodated at diametrically opposite sides of an outer surface of the housing 30. A sensing element of the proximity sensor is arranged to face the radially inner surface of the roller bore 15 with a small radial gap of e.g. 1.2 mm and detects changes in the radial gap. It is advantageous to arrange the sensors 25a, 25b in diametrically opposite pairs, as this improves accuracy in the event that a center axis of the sensor module is not completely coaxial with a center axis of the roller bore. The change in radial gap that is measured at diametrically opposite sides of the bore constitutes a differential measurement which cancels out any radial offset between the two axes.

In the depicted example, each proximity sensor is an inductive sensor whereby the sensing element is a circular coil arranged in a seat that is machined into the housing outer surface. A circular coil maximizes the Q-factor of the sensor, but other coil shapes are also possible. Preferably, the coil diameter is as large as possible within the constraints of the roller bore dimensions and the dimensions of the sensor module housing 30 on which the coil is seated. It has been found that an inductor coil with a diameter of 8-13 mm provides sufficient resolution and measurement accuracy for the application in question.

The coil of each inductive sensor 25a, 25b is connected to a capacitor in a LC tank circuit which is driven at resonance so as to generate a high-frequency magnetic field in the coil. This induces eddy currents in the facing surface of the roller bore, which generate a secondary magnetic field that opposes the primary field of the coil, causing an apparent shift in the tank resonant frequency that is proportional to the radial gap between the coil and the bore surface. This shift is detected in order to measure changes in the radial gap, and thus changes in the bore diameter due to deformation. The radial load on the roller at the location of the first sensor pair 25a, 25b is then derived from maximum and minimum peaks in the measured deformation as the roller and sensor module rotate during bearing operation. In the depicted example, the sensor module 20 is further equipped with a second pair of inductive sensors 26a, 26b and a third pair of inductive sensors 27a, 27b, which are axially spaced from the first sensor pair 25a, 25b to enable a load distribution to be determined along the length of the roller. Under normal operating conditions, the radial load at the axially central location should be somewhat higher than the load at the edges of the roller. If a higher load is calculated at one of the edges, this is indicative of an abnormal condition e.g. misalignment, which could require maintenance.

The electronics associated with each inductive sensor 25a, 25b, 26a, 26b 27a, 27b is suitably contained within one or more microcontrollers 41 or inductance digital converters (IDC) mounted on a PCB 40. In the depicted example, the two circular coils associated with one sensor pair are connected to a single micro-controller/IDC, although the number of connected coils can be higher, depending on the number of input channels of the microcontroller/IDC.

The sensor module 20 also comprises a processor 45 for calculating the radial load on the roller from the measured changes in bore diameter and an antenna 47 for transmitting the processed result to a receiver located outside of the bearing. The processor 45 and antenna 47 are also arranged on the PCB 40. The sensor module is further equipped with a battery 50 for powering the sensor and processing electronics. It is also possible for the sensor module to be equipped for generating its own electrical power from the rotation of the roller.

The inductive sensors arranged on the housing 30 enable deformation of the roller bore 15 to be measured in a contact-free manner. As mentioned above, the housing 30 is mounted to the roller bore 15 via the first and second sealing elements (refer FIG. 2a). The sealing elements in the form of O-rings are made of a compliant material such as NBR and take up deformations of the roller bore 15, thereby preventing the housing 30 from making contact with the bore. The O-rings also seal off the roller bore 15 from the environment, i.e. protect the electrical and electronic components of the sensor module 20 from exposure to moisture and contaminants such as lubricant. The housing may be made from a plastic material, and is sufficiently stiff in radial direction to ensure that the outer surface of the housing 30 does not come into contact with the bore 15 along its full length.

Advantageously, the sensor module 20 is configured such that components housed within the module can be replaced or serviced. Preferably, the housing 30 is formed from two semi-cylindrical halves which are connected together after the various components of the sensor module are mounted to one housing half. The housing halves may be screwed together via screw holes 51 provided in a fixation portion of the housing halves (refer FIG. 2b). Needless to say, other ways of joining the housing halves may be applied.

The first and second end caps 33, 34, which locate the housing in axial direction, are also easy to mount and dismount. In the depicted example, a threaded portion 36 is provided on an outer surface of each housing half, at both axial ends of the main cylindrical body portion of the housing 30, which match together to form an external thread. An internal thread is provided on the first and second end caps 33, 34 which are screwed onto the housing halves. Each end cap 33, 34 may be provided with a retaining lip which engages in a corresponding notch in each housing half, to prevent unscrewing of the end caps. Furthermore, the end face of the flange part 35 of each end cap may be provided one or more holes 35a or shaped recesses for cooperating with a tool that can be used screw the caps on and off.

The sensor module as whole is thus a self-contained unit that is easy to mount and dismount from the roller bore. Furthermore, the sensor module is not subject to wear, as there is no contact in radial direction between the bore and the sensor module housing, which facilitates a long service life of the sensor module.

What is claimed is:

1. A sensorized roller of a bearing, the sensorized roller comprising:
    a hollow bore extending in an axial direction of the roller;
    a sensor module being arranged within the roller bore, the sensor module comprising:
        at least one deformation sensor for detecting deformation of the roller bore due to a radial load acting on the roller, and
        a rigid housing that is shaped to fit inside the roller bore and is mounted within the inside of the roller bore having a small radial clearance between an outer cylindrical surface of the housing an inner cylindrical surface of the roller bore, the rigid housing comprising first and second rigid housing axial ends with a main cylindrical body extending therebetween, the main cylindrical body has a first outer diameter which is constant therealong, the main cylindrical body having an outer cylindrical surface, the at least one deformation sensor being located on the outer cylindrical surface,
    wherein each of the at least one deformation sensor is formed as a proximity sensor such that a sensing element of the proximity sensor faces a radially inner surface of the roller bore and measures a radial gap therebetween.

2. The sensorized roller according to claim 1, further comprising a processor carried within the sensor module housing, wherein the processor operates programming for calculating the radial load acting on the roller; and
    an antenna carried within the sensor module housing, wherein the antenna supports wireless transmission of the calculated radial load; and
    an energy source carried within the sensor module housing, wherein the energy source supplies electrical power to the processor, antenna and each proximity sensor.

3. The sensorized roller according to claim 1, wherein each proximity sensor is formed by one of a capacitive sensor, and optical sensor and an inductive sensor.

4. The sensorized roller according to claim 1, wherein the sensor module is radially supported within the roller bore by an axially spaced first resilient element and an axially spaced second resilient element, each of the axially spaced first resilient element and the axially spaced second resilient element are made from a compliant material that takes up deformation of the before and
wherein the axially spaced first resilient element and the axially spaced second resilient element prevents contact between the bore and the outer surface of the housing.

5. The sensorized roller according to claim 4, wherein the axially spaced first resilient element and the axially spaced second resilient element are annular elements which fully enclose and seal an annular gap between the roller bore and the outer surface of the housing.

6. The sensorized roller according to claim 1, the housing of the sensor module further comprises a first end cap and a second end cap, wherein each of the first end cap and the second end cap have a flange part that bears against a recess provided in the corresponding first end face and the corresponding second end face of the roller, so as to axially locate the sensor module relative to the roller bore.

7. The sensorized roller according to claim 6, wherein the housing comprises two semi-cylindrical housing portions which are joined together.

8. The sensorized roller according to claim 7, wherein the first axial end and the second axial end of the semi-cylindrical housing portions are provided with an external thread,
wherein the first end cap and the second end cap are provided with a cooperating internal thread.

9. The sensorized roller according to claim 1, wherein the housing comprises two semi-cylindrical housing portions that are joined together.

10. The sensorized roller according to claim 1, wherein the sensorized roller is integrated into a bearing.

11. The sensorized roller according to claim 1, wherein the first and second end cap each have a second outer diameter, the second outer diameter being greater than the first outer diameter such that the at least one deformation sensor is spaced from the radially inner surface of the roller bore.

12. A sensorized roller of a bearing, the sensorized roller comprising:
a hollow bore extending in an axial direction of the roller;
a sensor module being arranged within the roller bore, the sensor module comprising:
at least one deformation sensor for detecting deformation of the roller bore due to a radial load acting on the roller, and
a rigid housing that is shaped to fit inside the roller bore and is mounted within the inside of the roller bore having a small radial clearance between an outer cylindrical surface of the housing an inner cylindrical surface of the roller bore,
wherein each of the at least one deformation sensor is formed as a proximity sensor that is accommodated at the outer cylindrical surface of the housing such that a sensing element of the proximity sensor faces a radially inner surface of the roller bore and measures a radial gap therebetween,
a processor carried within the sensor module housing, wherein the processor operates programming for calculating the radial load acting on the roller; and
an antenna carried within the sensor module housing, wherein the antenna supports wireless transmission of the calculated radial load;
an energy source carried within the sensor module housing, wherein the energy source supplies electrical power to the processor, antenna and each proximity sensor,
the sensor module further comprising at least one pair of a first proximity sensor and a second proximity sensor, wherein the first proximity sensor and the second proximity sensor are arranged diametrically opposite from each other around a center axis of the sensor module,
wherein the processor operates to calculate the radial load acting on the roller based on the radial gap measured by each proximity sensor of the sensor pair.

13. A sensorized roller of a bearing, the sensorized roller comprising:
a hollow bore extending in an axial direction of the roller;
a sensor module being arranged within the roller bore, the sensor module comprising:
at least one deformation sensor for detecting deformation of the roller bore due to a radial load acting on the roller, and
a rigid housing that is shaped to fit inside the roller bore and is mounted within the inside of the roller bore having a small radial clearance between an outer cylindrical surface of the housing an inner cylindrical surface of the roller bore,
wherein each of the at least one deformation sensor is formed as a proximity sensor that is accommodated at the outer cylindrical surface of the housing such that a sensing element of the proximity sensor faces a radially inner surface of the roller bore and measures a radial gap therebetween,
wherein each proximity sensor is an inductive sensor and comprises a circular coil arranged at the outer surface of the sensor module housing, each proximity sensor is formed by one of a capacitive sensor, and optical sensor and an inductive sensor.

* * * * *